US011961108B2

(12) United States Patent
Raviv et al.

(10) Patent No.: US 11,961,108 B2
(45) Date of Patent: Apr. 16, 2024

(54) COMPUTERIZED SYSTEM AND METHOD FOR A MAIL INTEGRATED CONTENT DELIVERY AND ALERT SYSTEM

(71) Applicant: YAHOO ASSETS LLC, Dulles, VA (US)

(72) Inventors: Ariel Raviv, Haifa (IL); Chris Gonsalves, Sunnyvale, CA (US); Prateeksha Uday Chandraghatgi, Sunnyvale, CA (US); Ashok Kumar, Sunnyvale, CA (US); Ping-Hsiu Ben Tsai, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 178 days.

(21) Appl. No.: 16/225,514

(22) Filed: Dec. 19, 2018

(65) Prior Publication Data
US 2020/0202388 A1 Jun. 25, 2020

(51) Int. Cl.
*G06Q 30/0207* (2023.01)
*G06F 18/24* (2023.01)
*G06Q 30/0251* (2023.01)
*G06V 10/764* (2022.01)
*H04L 51/08* (2022.01)
*H04L 51/212* (2022.01)

(52) U.S. Cl.
CPC ......... *G06Q 30/0239* (2013.01); *G06F 18/24* (2023.01); *G06Q 30/0269* (2013.01); *G06V 10/764* (2022.01); *H04L 51/08* (2013.01); *H04L 51/212* (2022.05)

(58) Field of Classification Search
None
See application file for complete search history.

(56) References Cited

U.S. PATENT DOCUMENTS

| 5,832,457 A | 11/1998 | O'Brien et al. |
| 6,012,038 A | 1/2000 | Powell |
| 6,321,210 B1 | 11/2001 | O'Brien et al. |
| 6,934,684 B2 | 8/2005 | Alpdemir et al. |

(Continued)

FOREIGN PATENT DOCUMENTS

| KR | 20010090672 A | 10/2001 |
| WO | 1995030199 A1 | 11/1995 |

*Primary Examiner* — Chrystina E Zelaskiewicz
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel framework for analyzing messages associated with an inbox of a user, and providing functionality to the inbox for alerting the user to specific forms of content included within each message. Such functionality can include displaying messages and/or the content contained therein in a novel, dedicated and modified and/or embedded portion of a message inbox. The messages can also be modified upon display within in the inbox to indicate that the message includes content of a specific type. Also, messages that include specific content types can also trigger the disclosed framework to generate and provide alerts to the user indicating the inbox has received or includes specific forms of such content.

19 Claims, 10 Drawing Sheets

(56) References Cited

U.S. PATENT DOCUMENTS

| | | |
|---|---|---|
| 6,996,579 B2 | 2/2006 | Leung et al. |
| 7,783,532 B2 | 8/2010 | Hsu et al. |
| 8,494,914 B2 | 7/2013 | Mesaros |
| 9,946,760 B2 * | 4/2018 | Abou Mahmoud .. H04L 67/306 |
| 10,311,514 B2 * | 6/2019 | Eid ........................ G06Q 40/04 |
| 2005/0114207 A1 * | 5/2005 | Jania ................. G06Q 30/0241 |
| | | 705/14.4 |
| 2009/0259547 A1 | 10/2009 | Clopp |
| 2009/0276305 A1 | 11/2009 | Clopp |
| 2010/0145900 A1 * | 6/2010 | Zheng ................... G06N 7/005 |
| | | 709/206 |
| 2012/0209673 A1 | 8/2012 | Park |
| 2013/0041737 A1 | 2/2013 | Mishra et al. |
| 2013/0054329 A1 | 2/2013 | Bhatia et al. |
| 2013/0073374 A1 | 3/2013 | Heath |
| 2013/0073376 A1 | 3/2013 | Heath |
| 2013/0317894 A1 | 11/2013 | Zhu et al. |
| 2014/0006129 A1 | 1/2014 | Heath |
| 2014/0164093 A1 | 6/2014 | Libman |
| 2014/0278950 A1 | 9/2014 | Lemphers et al. |
| 2015/0100894 A1 * | 4/2015 | Kumar ................. H04L 67/535 |
| | | 715/752 |
| 2015/0112790 A1 | 4/2015 | Wolinsky et al. |
| 2016/0119268 A1 * | 4/2016 | Sharp .................... H04L 51/212 |
| | | 709/206 |
| 2016/0255034 A1 * | 9/2016 | Yuan ...................... H04L 51/42 |
| | | 709/206 |
| 2016/0373393 A1 * | 12/2016 | Seniak ................. H04L 67/306 |
| 2019/0356623 A1 * | 11/2019 | Everton .................. H04L 51/23 |
| 2019/0379625 A1 * | 12/2019 | Coffey ................... H04L 51/18 |

* cited by examiner

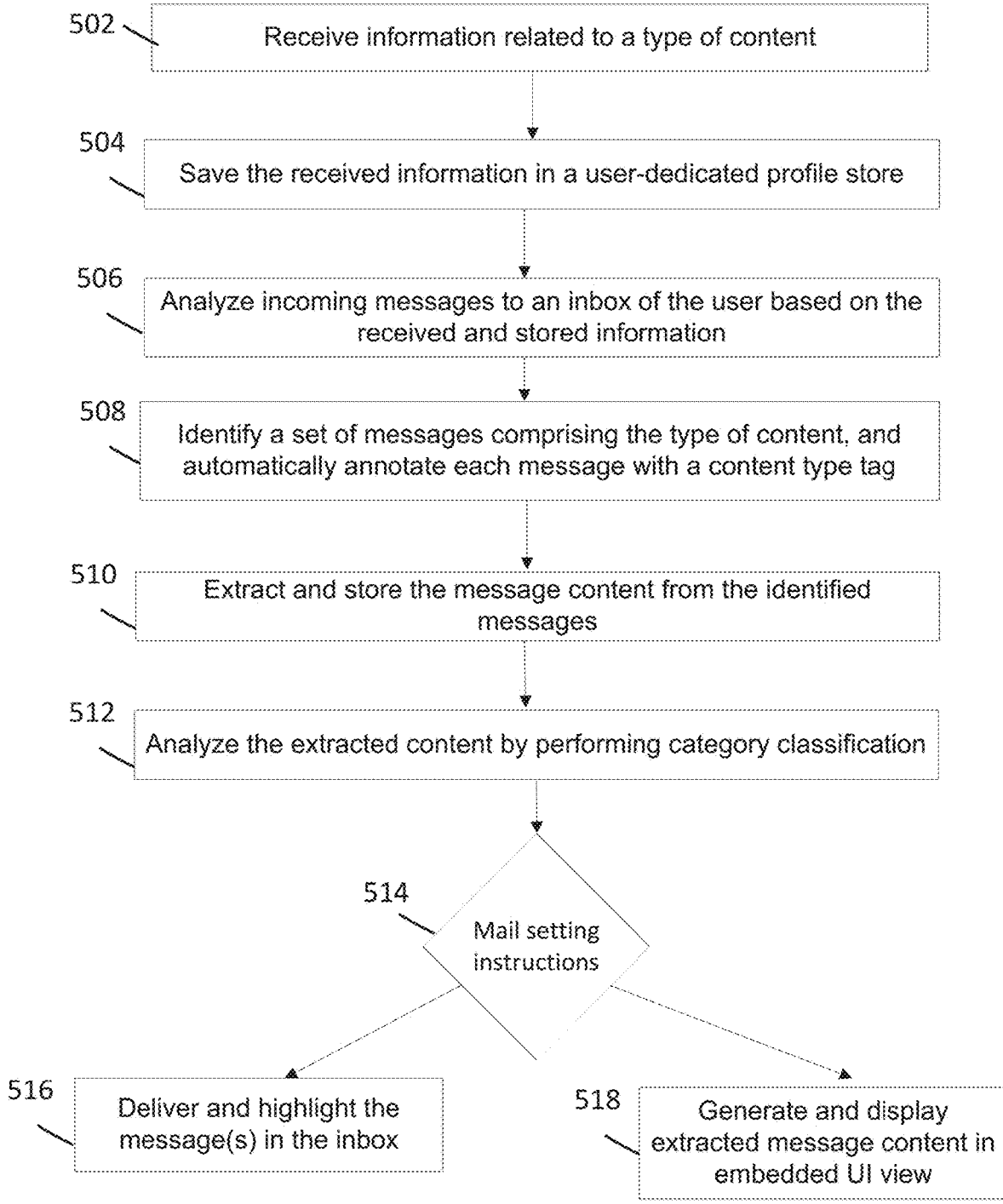

FIG. 6B

COMPUTERIZED SYSTEM AND METHOD FOR A MAIL INTEGRATED CONTENT DELIVERY AND ALERT SYSTEM

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content hosting and providing devices, systems and/or platforms by modifying the capabilities and providing non-native functionality to such devices, systems and/or platforms through a novel and improved framework for analyzing messages received at and stored within an inbox of a user, and providing functionality alerting the user to specific forms of content included within each message via an improved graphical user interface that facilitates more efficient navigation of messages by users.

BACKGROUND

Electronic mail (email) traffic keeps increasing, where the increase is mainly caused by high volumes of machine generated traffic. In order to keep up, web mail services must continue to offer more and more storage. In addition, data available to the applicant evidences that users rarely delete messages (82% never delete a single message), and even more rarely organize their messages in folders (70% never define a single folder, and out of the 30% who do, only 10% actually use them). The outcome of the above is a mailbox that serves as a data store (often considered specifically as such by the user), in which it is rather difficult to retrieve specific messages or specific types of content included therein. While the default mechanism for retrieving past messages or content contained therein is to perform a search, it is still sparsely used in Web mail, and even considered difficult and time consuming by many, as most search tools for mail are not robust.

Furthermore, data further evidences that over 60% of mail users (e.g., Yahoo! Mail®) use their account most often to receive emails from retailers that contain coupons. For example, Yahoo! Mail® currently extracts 2.2 billion coupons from messages every day, and 17 million users open coupon messages in a given month to utilize features like coupon clipping and browsing. However, the sheer amount of coupons received by users every day, and the lack of functionality and ease of use in conventional mail systems to handle the above identified issues often results in a state of information overload. Users lack a simple tool to browse through hundreds of deals just to get to the one or two that are relevant for them.

SUMMARY

The disclosed systems and methods provide a technical solution to existing technical problems, especially those highlighted above, by providing a novel framework that analyzes messages received at and stored within an inbox of a user, and providing functionality to the inbox for alerting the user to specific forms of content included within each message. The present disclosure describes computer systems, interfaces and methods that determine and display messages and/or the content contained therein in a novel, dedicated and modified and/or embedded portion of a message inbox.

According to some embodiments of the instant disclosure, when a message addressed to a user's message inbox is received at the server, the message content associated with such message is analyzed, extracted or otherwise identified. As a result of such messaging processing, in some embodiments, the message content can be provided to a user for display in an improved user interface that depicts a dedicated portion of the inbox (e.g., a separate view created and displayed within or associated with the inbox interface). This new UI facilitates the display of specific messages' content within the dedicated portion of the inbox thereby enabling the simultaneous access to and display of a plurality of content items that were previously unavailable within conventional messaging platforms (or applications) prior to the advent of the disclosed systems and methods.

Indeed, the automatic pre-processing (or pre-classification prior to delivery) being performed by the server as messages are received from senders eliminates the need for users to perform manual search queries for specific messages or specific forms/types of content included therein. Thus, as the server receives, processes and then passes on the messages to user accounts/devices, the messages are in-effect pre-processed so that the content included therein is ready for indexing, discovery and display within the receiving user's inbox.

This has a clear technical benefit for mailing systems, how they operate and how the disparate device resources of such systems are allocated and utilized. The pre-processing performed by the server eliminates the need for a device/user to search for and/or perform classification actions on incoming or stored messages. The messages are pre-classified prior to their delivery and are surfaced to the user in the novel manner discussed below and illustrated in FIGS. 6A-7B. Ultimately, this reduces the processing drain on the receiving client device and frees up resources for the client device. For example, throughput overhead on the client device in accessing an inbox or executing a mail application is reduced as the client device only now has to execute the instructions resultant from the server's pre-processing/classification of the message(s).

The server's pre-processing/classification also reduces resource overhead on the network—that is, rather than having the client device receive a message and then send/receive requests/instructions with the server for handling and/or indexing the messages, the server pre-performs these instructions prior to the message's delivery by modifying the message to include such instructions, whereby the client device simply must execute the server's instructions upon the modified message's reception in the inbox. Essentially, numerous functions for processing and handling messages are moved from the client device (as in conventional systems) to the server, which makes for a more efficient system of handling messages, and reduces the networking and computing resources required for handling the messages and processing message/content delivery.

According to some embodiments, the messages can also be highlighted in the inbox. That is, as discussed in more detail below, if a message is determined to include content related to a specific type (e.g., content related to a product or category the user has expressed, either explicitly or implicitly, interest in), then when that message is displayed within the inbox viewing portion of the UI of the inbox, the display can be modified to indicate that the message includes content of that specific type. In some embodiments, messages that include specific content types can also trigger the disclosed framework to generate and provide alerts to the user indicating the inbox has received or includes specific forms of such content.

As discussed herein, reference to "messages" can be any type of message that is receivable within any known or to be known messaging or email system. The message content comprised within such messages can be any type of message content, such as, but not limited to, text, audio, video, graphics interchange format (GIF) files, digital advertisements, and/or any other type of known or to be known multimedia, or some combination thereof. The modified UI displays provided by the disclosed framework can applied to any type of message or communication system, application, platform, web-based system or service hosting and/or associated with a user's mailbox to improve that system's functionality.

While additional advances, benefits and improvements to existing technologies will discussed in more detail below, the disclosed systems and methods enable the delivery and seamless display of message content within a user's inbox. This enables, among other features and added functionality, a more efficient use of UI or screen "real estate" (e.g., the visible portion of an app on a screen or the screen itself when fully or partially utilized) for the inbox versus the displayed message content, and also enables a user to navigate through different messages and message content that are included in the inbox and/or open at the same time on the user's device. The disclosed systems and methods enable improved message and message content navigation within a message platform or message application without requiring or having a user save, bookmark or otherwise identify the content for later viewing. Thus, the disclosed framework's advanced functionality for providing novel mechanisms for message's and their content included therein to more readily be discovered from the user's inbox enables the user to seamlessly and more rapidly navigate between the inbox and specific message content.

According to some embodiments, in embodiments where the message content is associated with and/or contains or itself constitutes a digital advertisement media item (e.g., an HTML message), the ability for a user to navigate from his/her personal messages to the digital ad content displayed within the portion of the inbox enables the increase of valuable impressions of online media that can increase monetization through higher click-through-rates (CTRs) and increased return-on-investment (ROI), revenues, salience and relevance of served content/online media.

In accordance with one or more embodiments, the instant disclosure provides computerized methods for a novel framework for analyzing messages received at and stored within an inbox of a user, and providing functionality alerting the user to specific forms of content included within each message. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework for analyzing messages received at and stored within an inbox of a user, and providing functionality alerting the user to specific forms of content included within each message.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 is a block diagram illustrating an exemplary data flow in accordance with some embodiments of the present disclosure;

FIGS. 6A-6B illustrate non-limiting example embodiments of the mechanisms for alerting users to specific types of messages and/or content within a user's inbox according to some embodiments of the present disclosure;

DESCRIPTION OF EMBODIMENTS

Figure 1:
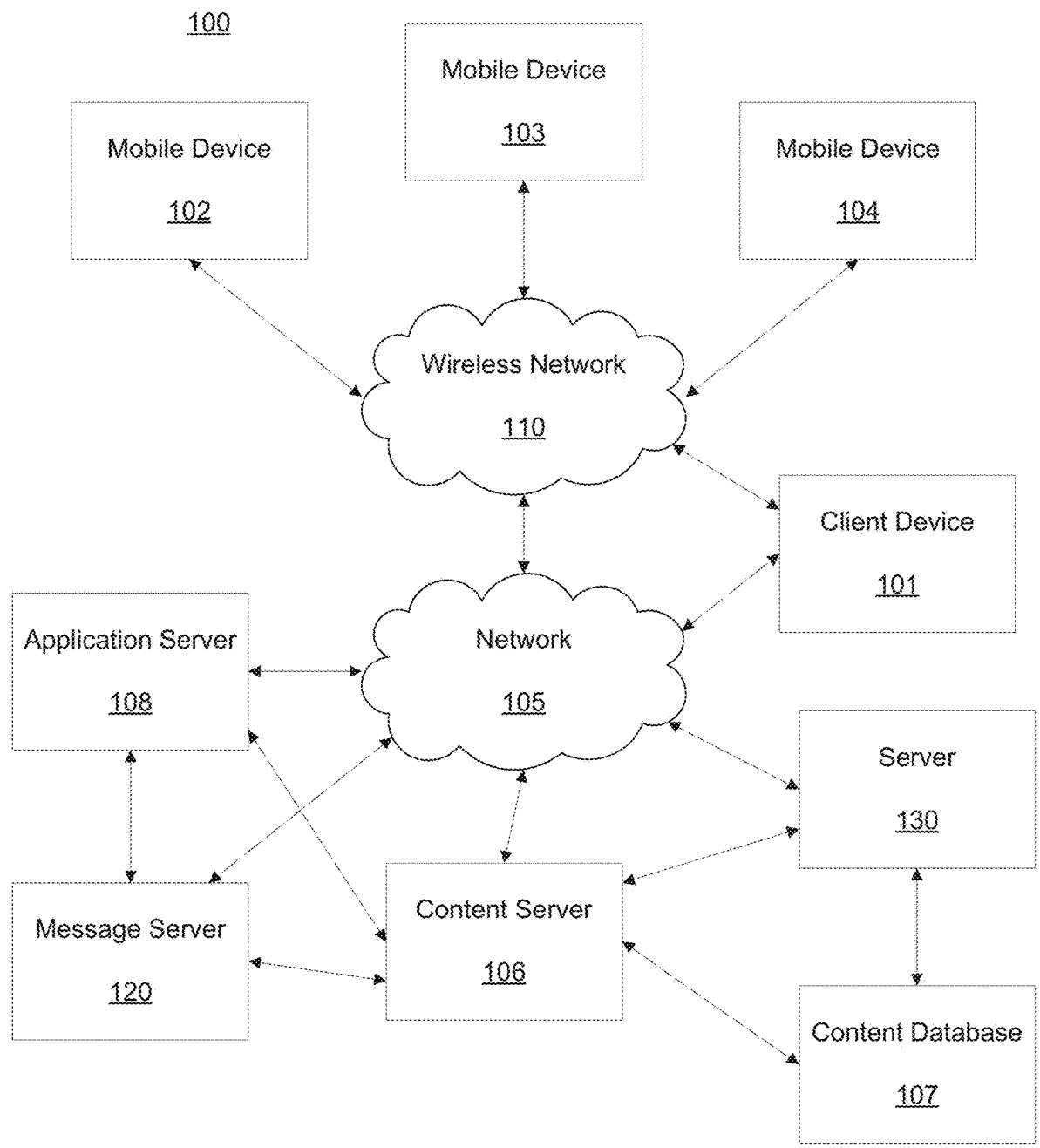
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as messaging functionality, browsing, searching, playing, streaming or displaying various forms of content, including locally stored or uploaded messages, images and/or video, or games (such as live broadcasts of professional sporting events).

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The instant disclosure provides improved systems and methods for processing, delivering and displaying message content within an inbox of a messaging system.

According to some embodiments of the instant disclosure, when a message addressed to a user's message inbox is received, the message content associated with such message is analyzed, extracted or otherwise identified by the handling server (e.g., Yahoo! Mail® server) prior to its delivery to the intended recipient user. As a result of such messaging pre-processing, in some embodiments, the message content can be opened for display within in a dedicated portion of the inbox (e.g., a separate view created and displayed within or associated with the inbox interface), as discussed in more detail below in relation to FIG. 7B. Such display of specific messages' content within the dedicated portion of the inbox enables the simultaneous access to and display of a plurality of content items that were previously unavailable within conventional messaging platforms (or applications) prior to the advent of the disclosed systems and methods.

In some embodiments, the dedicated inbox UI portion/view of specific messages and/or their content enables message content to be viewable within at least a portion of a message inbox, which is dedicated to specific messages and/or their content and is embedded as part of the inbox user interface (UI). Under such embodiments, the disclosed systems and methods provide improvements to, inter alia, message applications and platforms by displaying message content within the dedicated portion of the message inbox UI. In some embodiments, the message content displayable within the dedicated portion of the inbox is analyzed and must be of a certain content type. In some embodiments, the identification of the content that is to be displayed in the dedicated UI portion of the inbox is based on user input, which provides an indication that such content is being requested to be displayed in the dedicated UI portion. The display of particular message content within the dedicated UI portion enables multiple content items from multiple (i.e., different) messages to be viewable and/or open at the same time within the user's messaging inbox, all while the user is still able to access and interact his/her traditional inbox of messages. This improved navigational functionality, which can be implemented within any known or to be known messaging application, system or platform, allows for multiple messages and/or multiple content items from multiple messages to be open at the same time within respective dedicated portions of the user's messaging inbox.

In some embodiments, the messages can also be highlighted in the inbox. As discussed in more detail below in relation to FIG. 7A, if a message is determined to include content related to a specific type (e.g., content related to a product or category the user has expressed, either explicitly or implicitly, interest in), then when that message is displayed within the inbox viewing portion of the UI of the inbox, the display can be modified to indicate that the message includes content of that specific type. In some embodiments, as discussed in more detail below, messages that include specific content types can also trigger the disclosed framework to generate and provide alerts to the user indicating the inbox has received or includes specific forms of such content. In some embodiments, the content included in such highlighted messages is also available for user access from the embedded UI portion discussed above and illustrated in FIG. 7B.

Therefore, as discussed in more detail below, the present disclosure describes computer systems and methods that can display message content in manners that streamlines the way the users can access such content. Users will no longer have to manually search or "finger through" their messages in order to discover particular content items. Rather, the disclosed framework provides novel mechanisms for modified mechanisms in which particular messages are delivered to and displayed in an inbox (e.g., through the dedicated view, highlighting/augmenting and alerting, as discussed in relation to FIGS. 7A-7B). This enables a user to seamlessly navigate between different content that is open at the same time, as well as the main inbox view, without the need for saving or otherwise demarking such content for later viewing, which is novel messaging functionality not previously available to messaging users on conventional messaging systems.

In some embodiments, the messages being analyzed for display of their content within the delivery and viewing mechanisms of the instant disclosure can be associated with digital advertisement messages (e.g., messages that comprise digital content items relating advertisement or promotional information or functionality), as discussed in more detail below in relation to FIG. 8. Therefore, while some conventional ad display systems only enable ad content in messages to be displayed when the messages are opened and/or as a by-product of an ad search, the disclosed systems and methods enable digital ad content to be provided within a dedicated UI portion and/or window of the messaging inbox, which can effectuate an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message server 120 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 108, message server 120, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108 and/or 130 may be integrated into a single computing device, without departing from the scope of the present disclosure.

Figure 2:
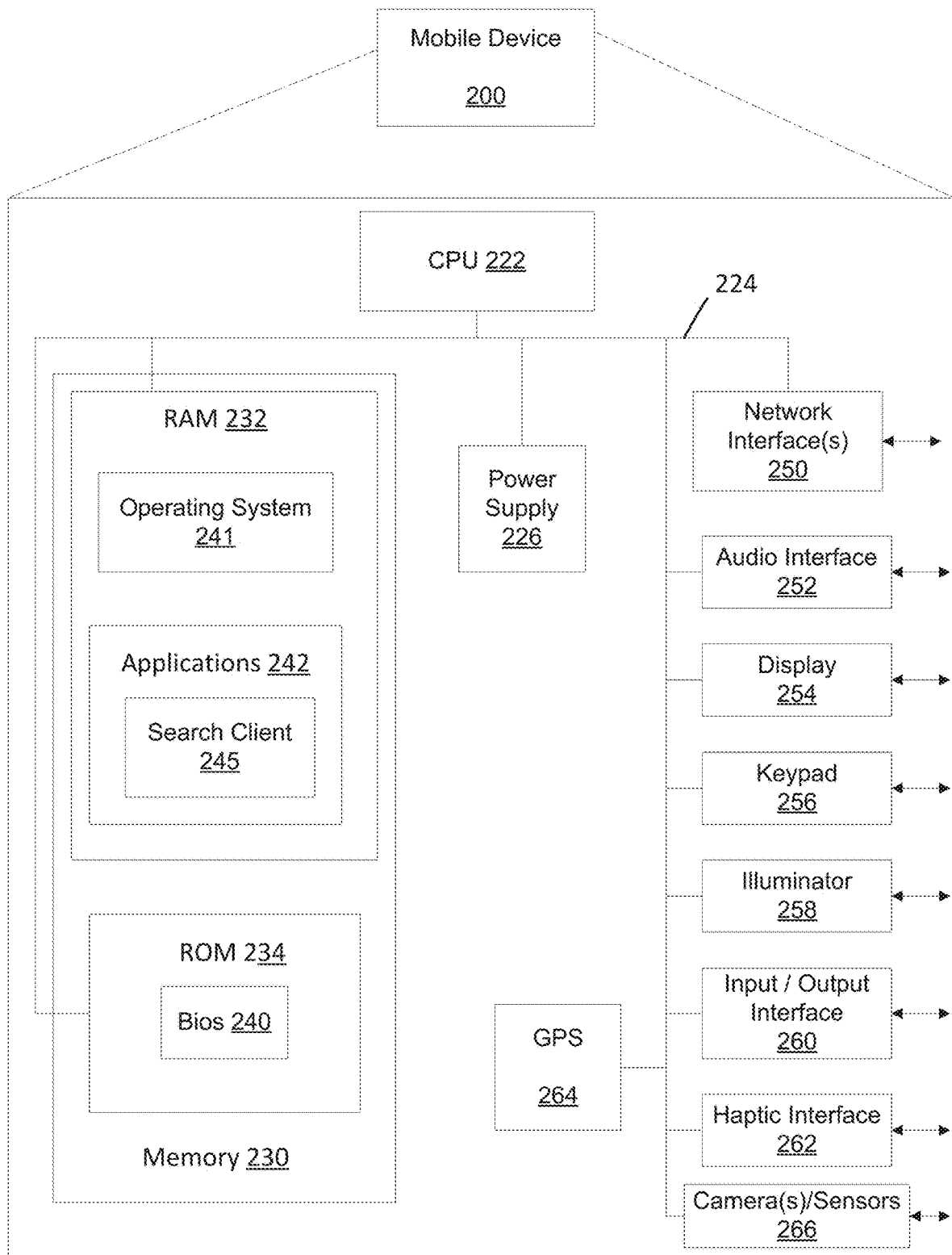
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-6.

Figure 3:
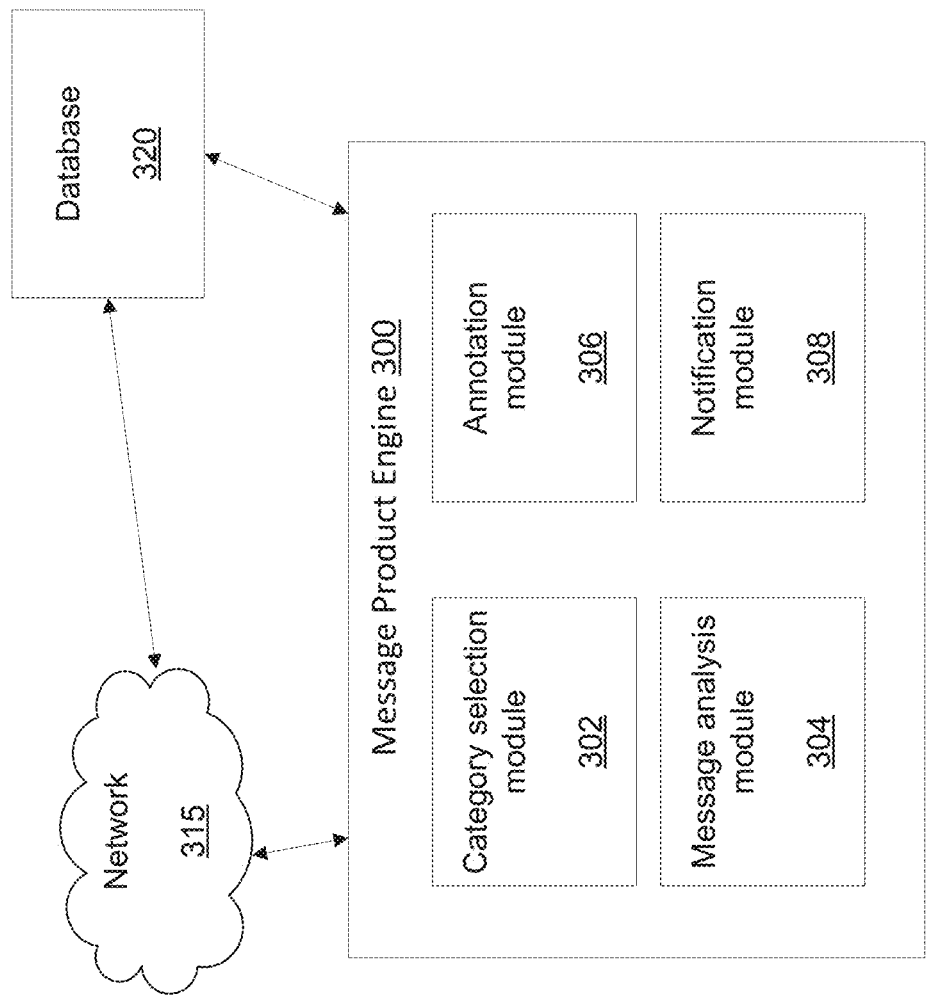
FIG. 3 is a block diagram illustrating components of an exemplary system in accordance with embodiments of the present disclosure.

FIG. 3 is a block diagram illustrating the components for performing the systems and methods discussed herein. FIG. 3 includes message product engine 300, network 315 and database 320. The message product engine 300 can be a special purpose machine or processor and could be hosted by an application server, content server, social networking server, web server, email server, search server, content provider, third party server, user's computing device, and the like, or any combination thereof.

According to some embodiments, message product engine 300 can be embodied as a stand-alone application that executes on a user device. In some embodiments, the message product engine 300 can function as an application installed on the user's device, and in some embodiments, such application can be a web-based application accessed by the user device over a network. In some embodiments, the message product engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, content type or category, information associated with the sender or recipient(s) of a message, information associated with content included in a message, and any other type of known or to be known attribute or feature associated with a message or content of a message, or some combination thereof.

According to some embodiments, information related to, derived from or otherwise determined from analysis of messages addressed to and/or hosted within a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages or other forms of electronic messages), other forms of messages (e.g., social media messages, Instant Messages (IMs)) and other mediums that display digital content information in whole or in part (e.g., a map), and the content included therein, including, text, audio, images, multimedia, RSS feed information, can be used without departing from the scope of the instant application, which can thereby be communicated and/or accessed and processed by the message product engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the message product engine 300, and the database of stored resources 320. Indeed, as illustrated in FIG. 3, the message product engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as message product engine 300, and includes category selection module 302, message analysis module 304, annotation module 306 and notification module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
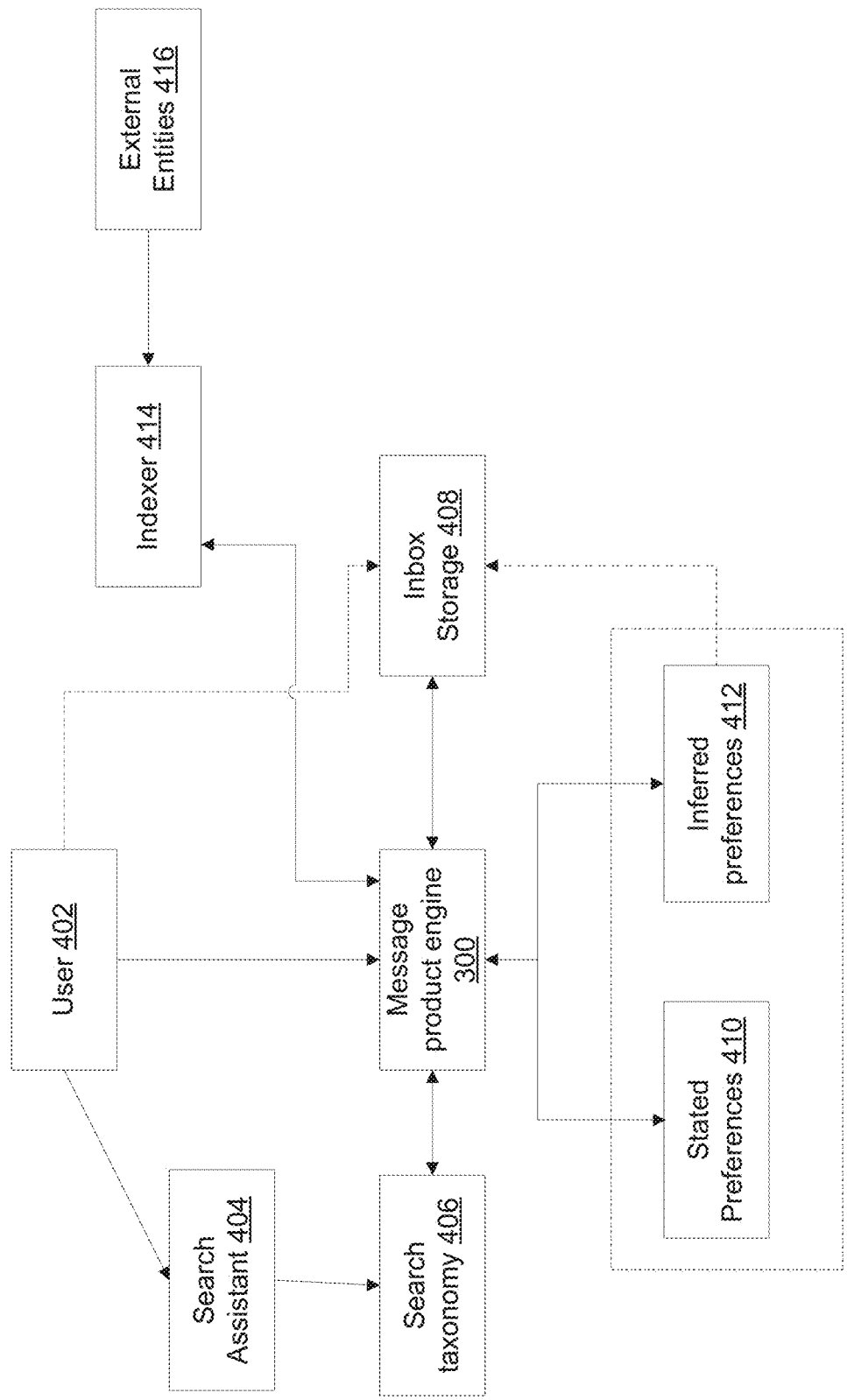
FIG. 4 is a schematic diagram illustrating components of an exemplary system in accordance with embodiments of the present disclosure.

FIG. 4 illustrates a non-limiting architecture design 400 for executing and implementing the disclosed systems and methods within a messaging system. As discussed in more detail below, the framework 400 comprises both offline and online processes for organizing, highlighting messages within an inbox and providing alerts within an inbox environment for specific types of message content based on a user's explicit (and/or inferred) preferences.

As discussed herein, according to some embodiments, the system can be triggered to "watch" for products and/or product categories. Such "watching" involves the engine 300 receiving, determining or otherwise identifying product input, which can be based on explicitly provided product input by a user, or based on inferred information determined from a user's activity (e.g., actions on messages, search history, product identifiers, merchant information, and the like (which can be performed offline). For example, a user can select a suggested product or product category, can input the product into a search entry area, or a product category can be determined based on a user's past purchase history.

Figure 6A:
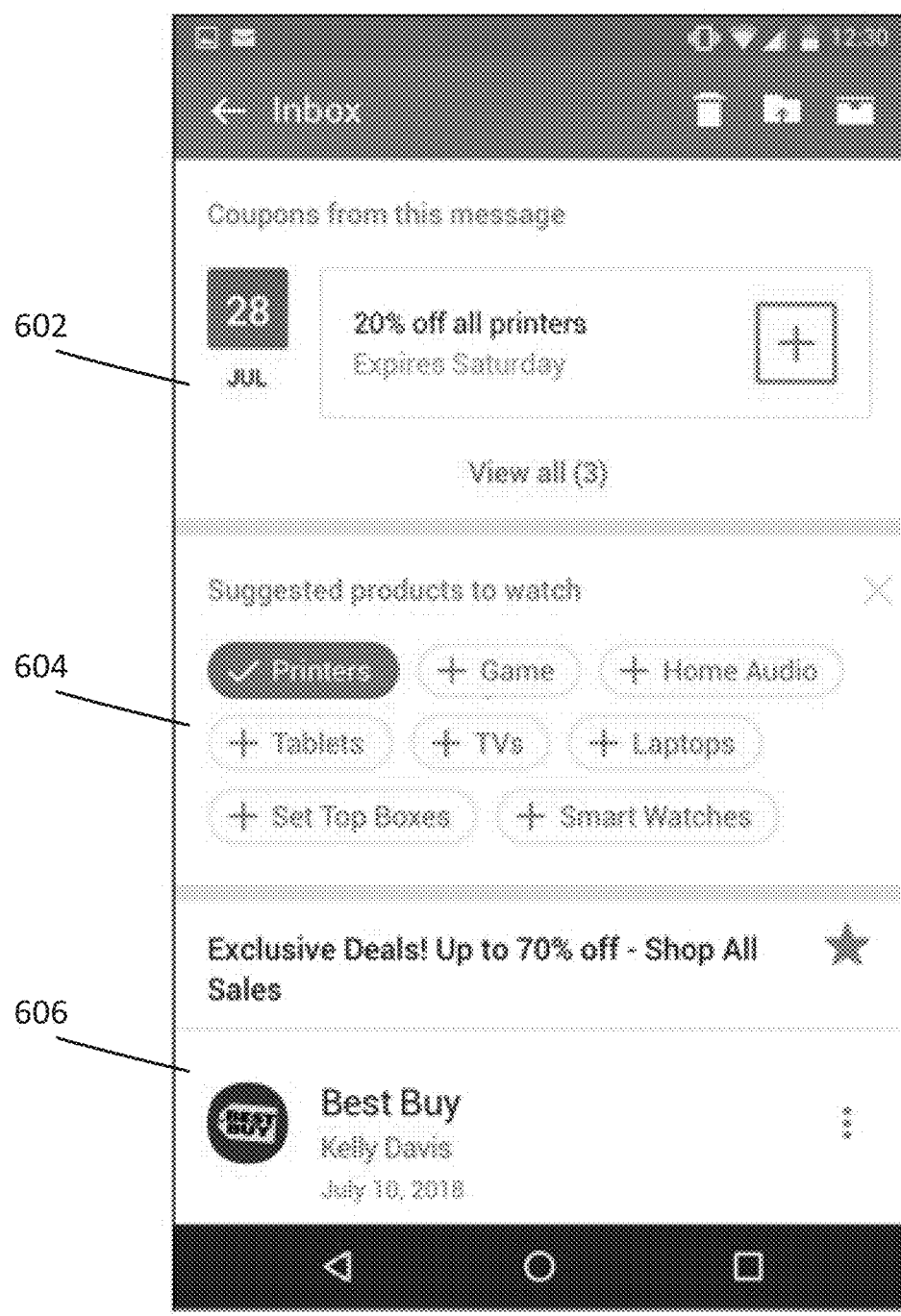

As illustrated in FIG. 6A, inbox interface 600 can be displayed on a user's device within a messaging application's interface window. Interface 600 can be a sub-window or embedded interface from within the main inbox window that can be displayed upon a user clicking on an icon to view this interface, or can be automatically displayed upon opening a mail item or the application itself. Interface 600 includes the display of a received mail portion 602, which displays a received mail message, suggested product portion 604, which displays suggestions of products or product categories based on the received mail message, and suggested content/deal portion 606, which provides a suggested deal from a datastore (e.g., indexer 414, as discussed below, which can include extracted/clipped content from messages associated with the user or other users).

For example, as displayed in interface 600, portion 602 depicts a deal received on July 28 for "20% off all printers" that expires on the following Saturday. Portion 604 depicts product suggestions for the user to additionally follow or "watch." These suggestions, as discussed in more detail below, can be based on the received message displayed in portion 602. For example, since the message in portion 602 involves a deal for printers, portion 604 can display interactive buttons or icons that the user can select to follow or "watch" additional products/categories. For example, the suggestions can be for "printers," "game," "home audio," "tablets," "TVs," "laptops," "set top boxes," and "smart watches," as they all relate to the category for printers or home A/V equipment.

Portion 606 also can be displayed which can be a deal discovered based on the information from the message in portion 602. Portion 606, for example, can display content related to a promotion from a third party provider, here BestBuy®, for 70% off electronics. As discussed below, the deal content displayed in portion 606 can be a deal sent to and received in the user's inbox, or can be a deal that was identified and retrieved from indexer 414, which was not previously sent to the user until reception of the message displayed in portion 602.

Figure 6B:
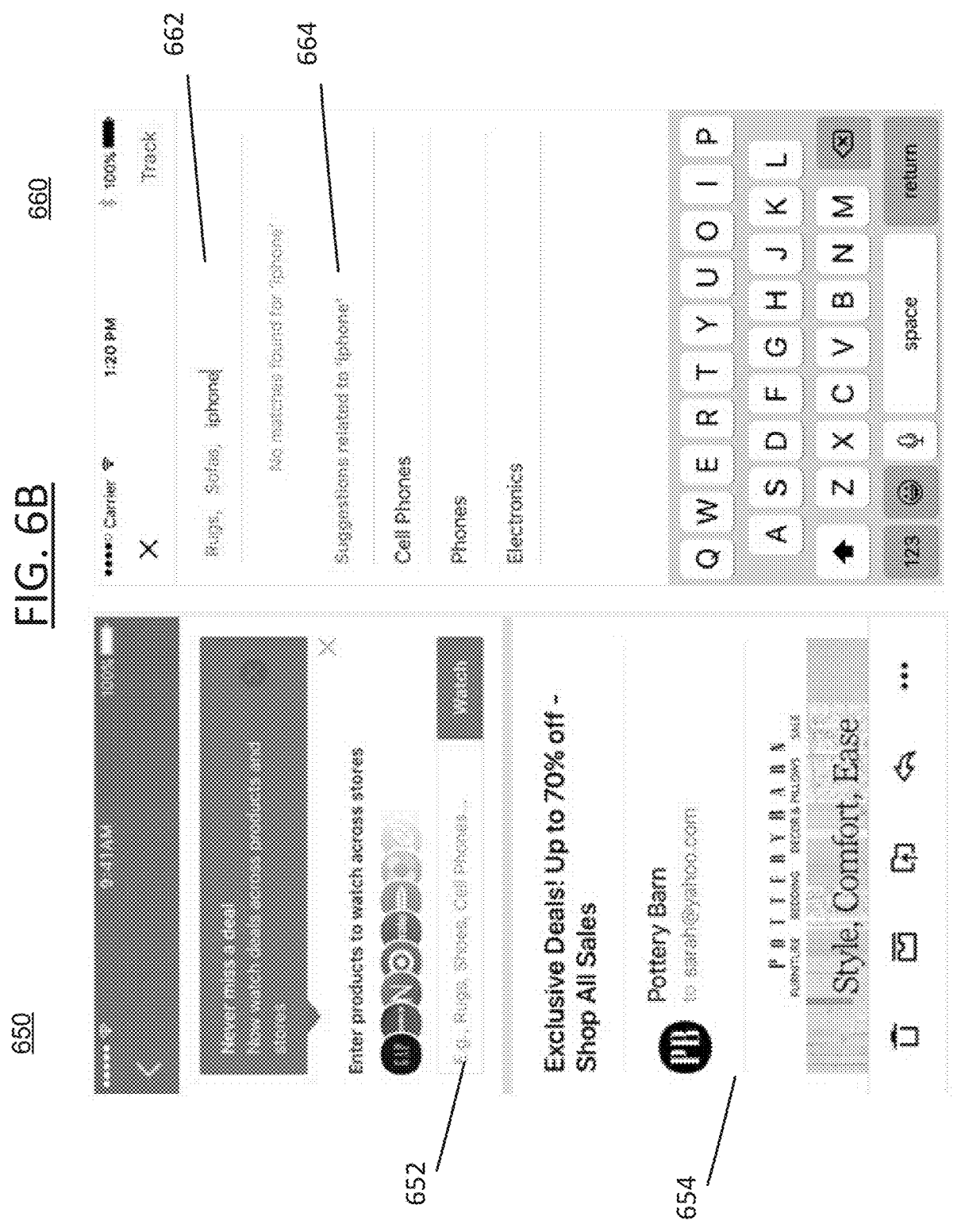

In another example, as illustrated in FIG. 6B, interfaces 650 and/or 660 can be displayed. Interfaces 650 and 660 are separate embodiments and can be alternatively displayed for purposes of a user providing product preferences.

Interface 650 is a sub-window to the inbox main display page from within a mail application that enables a user to enter products to watch via the text entry area 652. Text entry area 652 provides auto-complete capabilities that provide suggestions for completing the textual entry of the user, similar to the capabilities provided by search engines and other forms of known or to be known search query and search performing platforms and applications. Portion 654 within interface 650, in a similar manner to portion 606 from interface 600, provides a discovered deal, and, this deal is based on the input from the text entry area 652. For example, if a user enters a product category "Rugs" in area 652, portion 654 can display a third party deal from the store Pottery Barn®, which is provided because it includes promotional content for rugs.

Interface 660 provides a displayable pane or window that includes a text entry area 662 and suggestion portion 664. In a similar manner as discussed above in relation to interface 650, if a user enters the search term "iphone" in area 662, portion 664 can determine and provide (e.g., suggest) promotional product categories related to the entered term. For example, suggestions based off of the search term "iphone" can include, but are not limited to, "cell phones," "phones" and "electronics," as depicted in interface 660 of FIG. 6B.

According to some embodiments, as discussed in more detail below, when products or product categories are provided, they are stored in a database associated with the server for later retrieval and usage in providing product suggestions and deal suggestions. For example, they can be stored in database 320 in FIG. 3, which in FIG. 4 is embodied as the stated preferences item 410 (for explicitly supplied products/categories by a user) and inferred preferences item 412 (for implicitly supplied/determined products/categories for the user, as discussed above).

Turning back to FIG. 4, product preferences for a user 402 are supplied, and they are provided to the messaging engine 300 and the search assistant 404. The search assistant 404 technology enables the input preferences to be run through an open source search taxonomy 406 (e.g., a product and/or service taxonomy such as, for example, a curated Google Product Taxonomy (GPT)). The GPT 406 enables the input product preferences to be filtered to account and leverage the vast amount of product catalogs and their direct and indirect relationships found in the internet and within a user(s) inbox.

For example, if the input preference was for "animal & pet supplies", the taxonomy can provide additional related sub-categories that enables related digital coupon information to be discovered, as discussed below. For example, the taxonomy can be as follows:

Animals & Pet Supplies
Animals & Pet Supplies>Live Animals
Animals & Pet Supplies>Pet Supplies
Animals & Pet Supplies>Pet Supplies>Bird Supplies
Animals & Pet Supplies>Pet Supplies>Bird Supplies>Bird Cage Accessories In some embodiments, the taxonomy can be controlled by a threshold amount of sub-categories that limits the number of related sub-categories that are utilized.

Therefore, in some embodiments, the engine 300 is not simply provided the user's entered product preference information, but is provided a taxonomy of information that enables it to find the most encompassing, product related deals, as discussed below.

The architecture 400 of FIG. 4 further includes inbox storage 408, indexer 414 and external entities 416. Inbox storage 408 represents a datastore associated with the mail server that provides email storage, including all the data and metadata about a user's inbox, for each user. Such storage can include, but is not limited to, messages within an inbox of a user, and/or all users, the user's identity and other demographic information, actions or activity history from or within the inbox, extracted coupons from the user's inbox or from all users' inboxes, and the like, or some combination thereof.

Indexer 414 and external entities 416 provide the functionality for extracting and providing third party deals to users, as discussed above and in more detail below in relation to FIG. 8. External entities item 416 represents a network of third party providers (e.g., Groupon®, Walmart®, REI®, Home Depot®, EBates®, for example) that provide third party deals or digital coupons to users in a manner based on messages received in the user's inbox. For example, if a user receives a coupon in his/her inbox for hiking boots, then the Groupon® platform may be leveraged by engine 300 to identify and provide the user with deals for hiking adventures in the user's location. As discussed below, such third party deals are sourced from indexer 414 and can be displayed in the user's inbox, as in FIG. 7A and/or in the embedded UI portion, as in FIG. 7B. Indexer 414 acts as a storage component for such deals so that when engine 300 is searching for these deals, it can request, or pull, such data from indexer 414 without having to actually connect with the external entities 416, which increases the speed and efficiency in which deals can be provided/recommended to users.

Thus, the architecture 400 of FIG. 4 provides a backend that enables engine 300 to provide a dedicated user profile store that saves watched products and product categories for each user. The backend enables engine 300 to provide a categorization service that takes a deal's properties (e.g., merchant, description, price, and the like.) as an input and outputs the most relevant node in a given product taxonomy.

As discussed in more detail below in relation to FIGS. 5 and 7A-7B, the disclosed systems and methods, through engine 300 via the backend of architecture 400, enable a mail server to automatically, without user input, discover and provide relevant deals for a user based on selected products or product categories and received messages in a more streamlined, resource efficient manner. As discussed below, emails received in the user's inbox can be highlighted when they have a deal for a product or product category the user is watching—see FIG. 7A and the discussion below. Additionally, functionality for a separate, embedded (or tabbed) view from within the inbox can be provided where users can see all their currently watched products and categories, and any unexpired deals that relate thereto in their inbox—see FIG. 7B and the discussion below. Thus, users can receive alerts and notifications for relevant deals as soon as they arrive in their inboxes without having to perform any actions on the client side.

Turning to FIG. 5, Process 500 provides an example data flow that details embodiments of the disclosed framework for analyzing messages shared over a network (e.g., messages that have been sent, received, and/or are being sent and/or received), and identifying content included therein that is of particular interest to the user. As a result, Process 500 enables the inbox UI's functionality to be modified so as to alert the user to the arrival of such specific content in his/her inbox (as illustrated in FIGS. 6A-7B, and discussed in more detail herein).

According to some embodiments of Process 500 of FIG. 5, Steps 502-504 of Process 500 are performed by the category selection module 302 of the message product engine 300; Steps 506 and 512 are performed by the message analysis module 304; Step 508-510 are performed by the annotation module 306; and Steps 514-518 are performed by the notification module 308.

Process 500 begins with Step 502 where information related to a type of content is received. As discussed above, this information corresponds to a product or product category a user desires to "watch" from his/her inbox—see discussion above related to FIGS. 4 and 6A-6B.

In Step 504, the received information is stored in a user-dedicated profile store. As discussed above, this can be saved in database 320 in FIG. 3, as embodied in FIG. 4 as the stated preferences item 410 and inferred preferences item 412. As discussed above, this storage is in association with the mail server providing the mail functionality (e.g., Yahoo! Mail® server), such that the mail server can process incoming messages prior to their delivery to the user's inbox, thereby off-loading the heaving processing load from the client device.

In Step 506, an incoming message(s) to the user's inbox is received by the server and is analyzed based on the received and stored information (from Steps 502-504). According to some embodiments, the identified message(s) is an incoming message sent by a sender that is directed to the recipient's inbox currently being processed by the server. In some embodiments, the steps of Process 500 can be performed for each incoming message addressed to a recipient's inbox.

In some embodiments, as understood by those of skill in the art, the steps of Process 500 can be performed by messages already delivered to the inbox of the message, whereby the server is mining the inbox for past messages that can relate to newly supplied product information. While the focus of the discussion herein will focus on incoming messages, one of skill in the art would understand that such mining for messages can be embodied through execution of the steps of Process 500 without departing from the scope of the instant disclosure.

In some embodiments, the set of messages analyzed by Process 500 can be a set of messages addressed to the user's inbox. The identification of the messages can be based on criteria such that only a set of all the messages in the inbox are identified. Such criteria can reference a type of message (e.g., personal or commercial messages), the type of content included in the message (e.g., text, audio, video, multimedia, and the like), a context of the message (e.g., is the message related to a promotion, purchase receipt, expiring deal, future activity, and the like), a time period, location associated with a message(s) (e.g., where was the message sent from, what location does the message reference, where was the message received, and the like), an identity of a sender, other recipients of a message (e.g., if it was a group message), which platform the message originated from (e.g., was it a message from another messaging platform), is the message unread, was the message acted upon (e.g., was it forwarded, responded to, saved, categorized or deleted), how was the message checked/read (e.g., did the user open and read the message from an application on his/her mobile device), how often or recent (compared to a threshold) did the user contact or receive correspondence from the sender/recipient, and the like, or some combination thereof.

Therefore, according to some embodiments, Step 506 involves analyzing received or incoming messages according to the criteria and identifying a message set (e.g., a single message or a plurality of messages) that satisfy the criteria. This enables engine 300 to efficiently analyze and process a smaller set of messages, as those messages not satisfying the criteria are filtered out and automatically passed to the inbox without further processing, which alleviates the system from having to perform unnecessary analysis of certain types of messages (e.g., spam messages received during a same time a message from a commercial sender providing a deal is occurring).

For example, Step 506 can involve determining a set of messages that are sent by a third party commercial sender. For example, a user receives 100 emails a day—therefore, according to Step 506, engine 300 can identify a subset of those emails that are from commercial entities, thereby filtering out those messages that do not have coupon, deal or promotional information included therein. According to some embodiments, Step 502 can involve parsing the data of each message addressed to the user's inbox, and after analyzing the message based on the above criteria, identifying each message in the set therein (e.g., based on the criteria).

In Step 508, the analysis of Step 506 results in identifying a set of messages that comprise the type of content identified in the saved product information (from Step 504). Upon the identification of the type of content included therein, the messages can be annotated by the server so that it is discoverable based on a product or product categorization, as discussed above. Thus, a received message is modified prior to its delivery to the user's inbox with information indicating whether it matches a product preference provided by the user (in Step 502).

For example, if a message sent by a third party sender includes product information that matches the user's provided product category preferences (e.g., the user provided product preferences for restaurant deals, and the message includes a clickable multimedia item referencing a restaurant coupon for later in the week), Steps 506-508 involve analyzing the information based on the preference provided by the user, and, based on such analysis, determining that the message would be of interest to the user. From here, the server, via engine 300, can modify the message data/metadata by annotating it with a tag (or other form of data/metadata) to indicate that the message corresponds to the specific user provided preference.

According to some embodiments, engine 300 can identify the type of information referenced in the message based on language content in the message. In some embodiments, this can be focused on the plain text of the message, and in some embodiments, this can alternatively or additionally involve the text within multi-media portions of the message. In some embodiments, engine 300 may analyze the language content by executing software defined by a natural language processing (NLP) algorithm. An NLP algorithm, in one embodiment, can use probabilistic methods to identify one or more topics from the language content of the message. In some embodiments, engine 300 may search for keywords within the language content, the keywords being associated with particular topics.

In some embodiments, engine 300 can identify the type of information referenced by the message based on a syntactic analysis or a sematic analysis of the language content of the message. The syntactic analysis may involve parsing the message into discrete components, such as clause or phrases, where each component has a central idea (e.g., a keyword). The semantic analysis may involve identifying the central idea of each discrete component identified through the syntactic analysis.

In some embodiments, the analysis of the messages by the engine 300 can involve the engine 300 implementing a parser on the backend in order to analyze the information (e.g., sender information, text, images, audio, video and/or multimedia) of the message. The parser is responsible for extracting any relevant content from the message using natural language processing techniques, from which the context and item information, as discussed below, can be determined, derived or otherwise identified.

In Step 510, the messages that have been identified (and annotated) as having the type of content referenced by the user (from Step 502) are further analyzed, parsed and have the specific content from within the messages that corresponds to the type of content extracted (referred to as "clipping" the content from the messages, as discussed below). For example, if a user indicated that she is interested in "tools," and the user received a message from "Home Depot" indicating a weekend deal on Stihl® products, where the message included a digital coupon included therein, then the digital coupon information from the message is identified (based on the annotation) and is extracted and stored. In some embodiments, the storage of the clipped tool coupon can be stored in inbox storage 408.

In Step 512, the extracted content is analyzed by executing a classification and regression software, for example, K-nearest neighbor (KNN) classification software. Such classification and regression software execution results in analysis of the stored coupons (e.g., extracted content from the current set of messages and those already stored in storage 408) in order to determine the type of content included therein, what the content is specifically referencing with regard to specific products or a categorical taxonomy, and to ensure that the content is not a duplicate of previous content included therein.

For example, as understood by those of skill in the art, a KNN classification algorithm can be implemented by respectively defined software that collects categorized products from given catalogs and crawled data, removes duplicated products and near-duplications, maintains a tailored coupon stopword list (e.g. "Up to . . . ", "Today's sale . . . "), applies grouping algorithms (e.g., Lemmatization) and/or part-of-speech (POS) tagging algorithms (e.g. "hats"->"hat"->Noun), and then assign weights to word frequency in titles, brands and categories. The result of which is an instance based learning (e.g., machine learning) sub-system that can determine product information from messages that matches product preferences of users.

In Step 514, based on the KNN classification of the extracted content of the received and identified messages, engine 300 analyzes mail settings of the user's inbox and then determines how to provide the messages and content included there to the user so as to alert the user to the deals included therein. In some embodiments, the mail settings can be user provided (e.g., the user prefers to have messages highlighted upon their display within her inbox); and in some embodiments, the mail settings can be based on the type of application and/or device the user is using (e.g., based screen resolution, screen real-estate, and/or device and/or network capabilities for providing a specific alert to the user based on the type of content).

According to some embodiments, Process 500 proceeds to Step 516 where the incoming message(s) delivered to the inbox is "highlighted" to the user thereby indicating that it includes product information matching that input by the user. Rather than simply changing the display (e.g., color) scheme of the message to indicate it is new, as in conventional systems, the disclosed framework herein "highlights" the message by modifying the message's display in the inbox to indicate that the message is for a specific deal the user has expressed interest in, and further indicates why such interest has been satisfied (e.g., displayed tag interface objects indicating which product preferences are being satisfied).

Figure 7A:
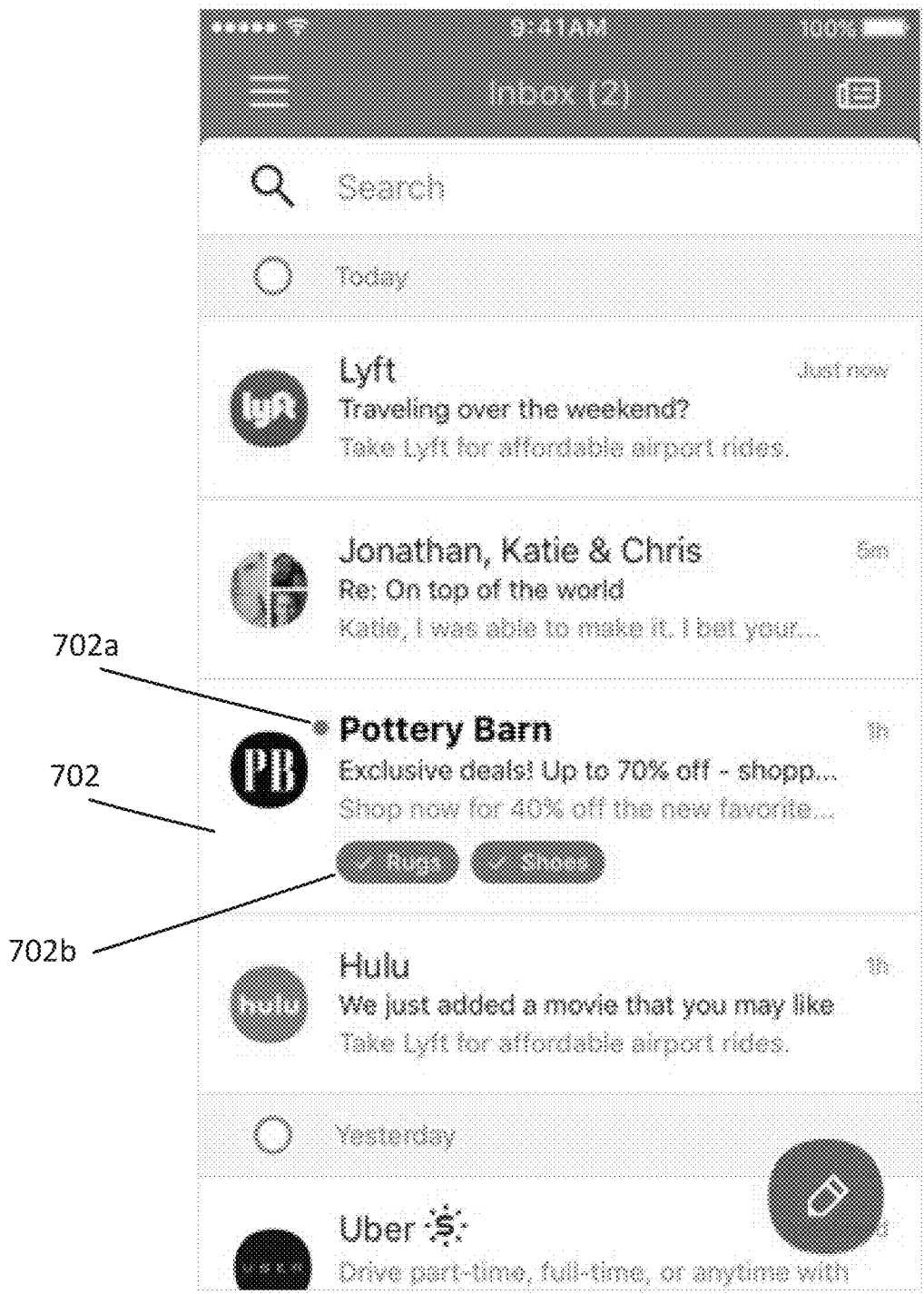
FIGS. 7A-7B illustrate non-limiting example embodiments of the mechanisms for alerting users to specific types of messages and/or content within a user's inbox according to some embodiments of the present disclosure.

For example, as illustrated in FIG. 7A, a user's inbox UI 700 is displayed which includes a set of received messages. Message 702 is a message that includes content that matches that of the product preferences of the user. For example, the user input that she is interested in "rugs" and "shoes" as product preferences; therefore, upon the entity Pottery Barn® sending the user a promotional email, engine 300 determines that this matches the user's preferences (according to Steps 506-512) and displays the message within the inbox UI 700 in a modified manner. The modified manner can include a "pill" or indicator 702a that indicates that not only is the message a new message, but it also contains a deal/promotion for a product or product category matching the user's predefined product preferences.

In some embodiments, the display of the message 702 within UI 700 can be further modified to indicate which product preferences of the user that it matches. For example, the user input that she is interested in "rugs," "shoes" and "toys" as product preferences; therefore, the display of message 700 can be modified such that when it is displayed within the inbox UI 700 it includes item 702b, which indicates that the message includes content for deals for "rugs" and "shoes".

According to some embodiments, Process 500 proceeds to Step 518, either in the alternative to Step 516 or in response to a user selection of a message or interface object providing access to dedicated inbox interface, where a UI display interface is generated for displaying the extracted message content within an embedded view of the inbox UI.

Figure 7B:
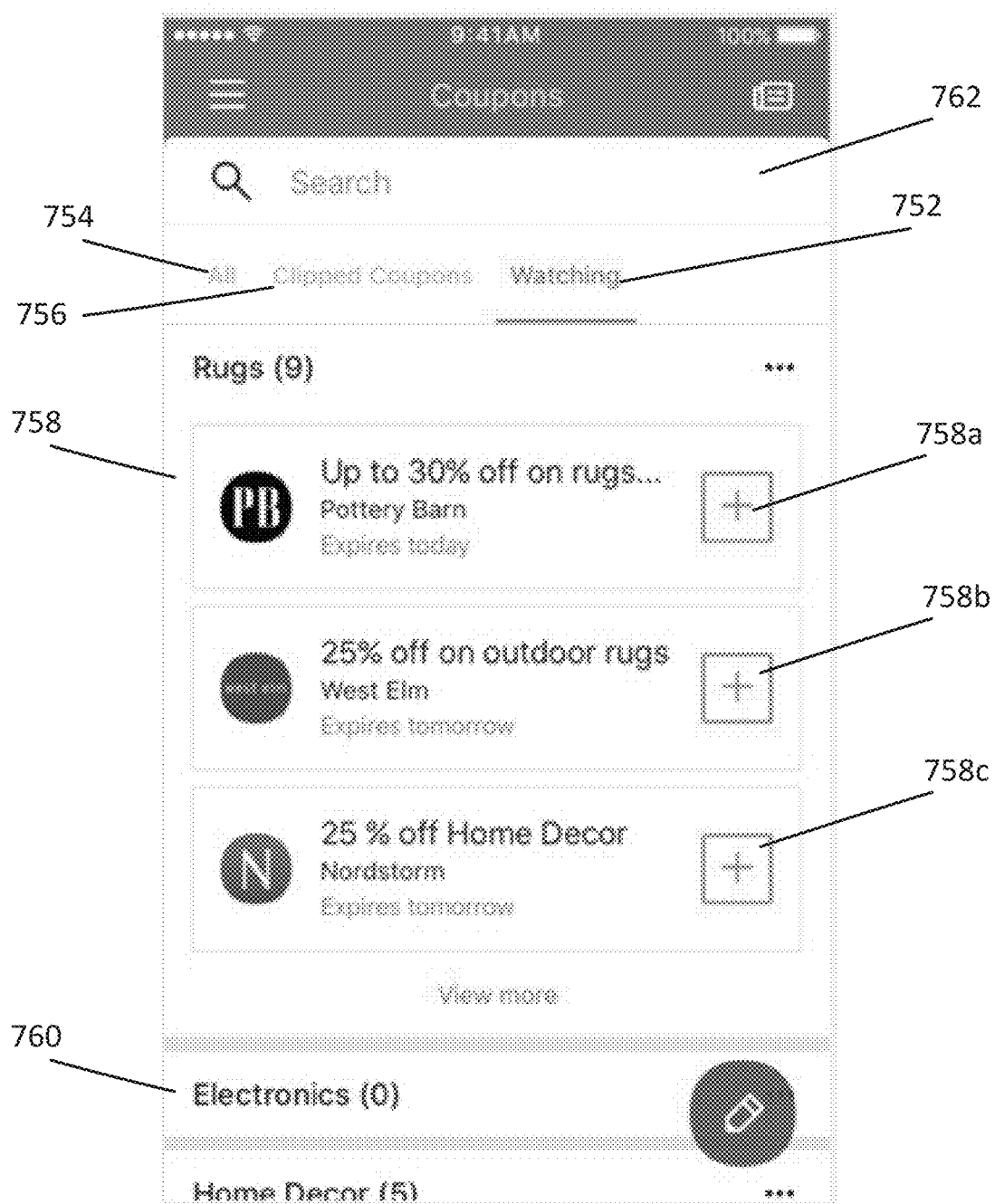

For example, as illustrated in FIG. 7B, interface 750 is displayed which can be a dedicated smart page within the hierarchy of the inbox UI 700. Interface 750 includes selectable interface objects 752, 754 and 756, which correspond to an "all messages" tab, "clipped coupons" tab and a "watching" tab, respectively. It should be noted that the names of these tabs are non-limiting, as the naming nomenclature can change depending on a variety of factors, including, but not limited to, the types of content being accessed, the types of messages being identified, the recipient's identity, and the like, or some combination thereof.

For example, as illustrated in FIG. 7B, the "all" tab 754 provides a view of all messages received by the user. The "clipped" tab 756 provides a view of all forms of extracted (referred to as "clipped") content from messages; in some embodiments, this can be solely for clipped coupons for the user, and in some embodiments, this can be a way for users to view clipped coupons for all users.

The "watching" tab 752, which is the selected view of interface 750, provides a view of clipped coupons that match the user's provided preferences. For example, the user provided the preferences to watch for products of "rugs" and "electronics". Therefore, there is a UI portion within interface 750 for "rugs"—item 758, which shows that there are 9 clipped coupons for rugs from which the user can select and act upon; and there is a UI portion within interface 750 for "electronics"—item 760, for which there is currently no usable coupons (e.g., if a coupon expires, it is removed from the watching view 752.

The "rugs" portion 758 of the watching view 752 has included therein 9 coupons for viewing and selecting by the user. In the example depicted in FIG. 7B, only 3 are shown, but the remaining 6 can be viewed by the user selecting on the "view more" button. The 3 coupons, referenced as 758a, 758b and 758c include a "+" icon that also enables the user to select and open the content so that the user can retain the deal being referenced.

Thus, FIG. 7B illustrates a smart view for which the user can access all of the messages included in his/her inbox, while also tabbing to clipped coupons that match the user's product preferences. As such, Process 500, in accordance with the discussion of FIG. 4 and the example depictions from FIGS. 6A-7B, provide a novel framework for analyzing messages associated with an inbox of a user, and providing functionality to the inbox for alerting the user to specific forms of content that satisfy a user's product preferences.

Figure 8:
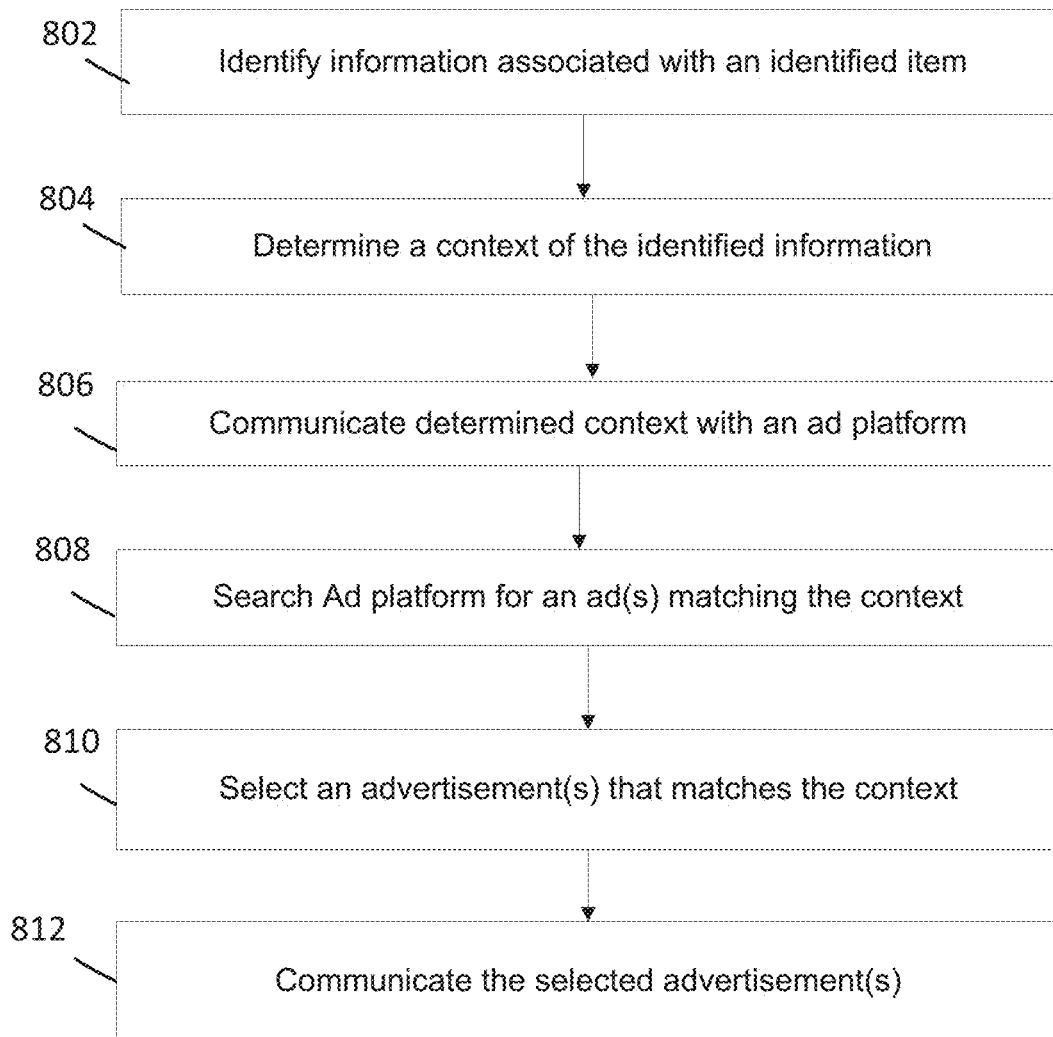
FIG. 8 is a block diagram illustrating an exemplary data flow in accordance with some embodiments of the present disclosure.

FIG. 8 is a work flow process 800 for serving related digital media content based on the information associated with an identified item from a user's inbox, as discussed above in relation to FIGS. 4-7B. In some embodiments, the content can be associated with or comprising advertisements (e.g., digital advertisement content). Such content, referred to as "item information" for reference purposes only, can include or be based upon, but is not limited to, information associated with an object a user received in his/her mailbox (e.g., a message or piece clipped content, for example), a context of a user's activity on a network and the like (e.g., how did the user interact with a message or extracted item information, and/or some combination thereof).

Process 800 discusses embodiments for engine 300 to provide functionality for mail systems to partner with third party entities enabling the entities to source digital content for display within an inbox of a user based on the item information determined, discovered, derived or otherwise identified from Process 500, as discussed above. For example, if a user has a clipped coupon within his inbox related to hockey gear, then according to some embodiments of Process 800, as discussed herein, engine 300 can partner with Groupon®, for example, and provide additional messages for hockey events or products (e.g., messages that comprise digital content associated with deals provided by/through the Groupon portal) that were not previously addressed or sent to the user's inbox. As discussed above in relation to FIG. 4, such deals from Groupon were provided by external entities 416 and were saved in indexer 414 for retrieval by engine 300.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 802, item information is identified. As discussed above, the item information can be based any of the information utilized, determined and/or generated from/during the mail pre-processing and delivery mechanisms outlined above with respect to FIGS. 4-7B. For purposes of this disclosure, Process 800 will refer to single identified item for serving additional content; however, it should not be construed as limiting, as any number of items, messages and/or views, as well as programs used can form such basis, without departing from the scope of the instant disclosure.

In Step 804, a context is determined based on the identified item information. This context forms a basis for serving content related to the item information. In some embodiments, the context can be in accordance with whether a user interacted with the item information included in a clipped content item.

For example, a user receives a message from the NHL® online store about gear for the Boston Bruins®, and this message is pre-classified and displayed in the user's inbox according to the mechanisms discussed above. Therefore, the context identified in Step 804 can be related to "hockey". This context can be leveraged in order to identify digital content related additional deals for the user—since the user is already receiving deals for NHL apparel, the system can locate local deals for the user—for example, network content for obtaining discounts to minor league hockey tickets in the user's area.

In some embodiments, the identification of the context from Step 804 can occur before, during and/or after the analysis detailed above with respect to Process 500, or it can be a separate process altogether, or some combination thereof.

In Step 806, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 808, the server searches the database for a digital content item(s) that matches the identified context. In Step 810, a content item is selected (or retrieved) based on the results of Step 808. In some embodiments, the selected content item can be modified to conform to attributes or capabilities of the page, interface, message, platform, application or method upon which the content item will be displayed, and/or to the application and/or device for which it will be displayed. In some embodiments, the selected content item is shared or communicated via the application the user is utilizing to view, render and/or interact with a message, text, media, content or object item. Step 812. In some embodiments, the selected content item is sent directly to a user computing device for display on the device and/or within the UI displayed on the device's display (e.g., the inbox or within the tabbed view as illustrated in FIGS. 7A-7B). In some embodiments, the selected content item is displayed within a portion of the interface or within an overlaying or pop-up interface associated with a rendering interface displayed on the device. In some embodiments, the selected content item can be displayed as part of a coupon/ad clipping, coupon/ad recommendation and/or coupon/ad summarization interface (e.g., as in FIG. 7B).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:
1. A method comprising:
receiving, at a messaging server over a network, content preference information from a user via a user interface (UI) of a messaging application operating on a device of the user and in communication with the messaging server, said content preference information identifying a user-specified interest of the user in a type of content to watch for in electronic messages addressed to an inbox of the user;

receiving, by the messaging server, an electronic message addressed to the inbox of the user, said electronic message comprising digital content;

analyzing, via the messaging server, said electronic message based on said content preference information identifying an interest of the user specified by the user via the UI, and based on said analysis, determining that the digital content included in said electronic message contains data that corresponds to the type of content of interest to the user identified by said content preference information specified by the user via the UI;

annotating, via the messaging server, said electronic message based on said determination, said annotation comprising modifying said electronic message prior to communication to said inbox of the user by adding a content type tag to the electronic message indicating that said digital content of said electronic message contains data that corresponds to the type of content of interest to the user identified by said content preference information;

executing, via the messaging server, a classification and regression software program on said digital content and determining, based on said execution, an identification of a context of the digital content, said context referencing a specific content or a categorical taxonomy; and communicating, via the messaging server, to said inbox of said user, said modified message including the digital content containing the data and the added content type tag indicating that said digital content corresponds to the type of content identified by the content preference information as being of interest to the user for visual display at the inbox of the user in the UI of the messaging application, said communication of said modified message with the added content tag causing the modified message to be displayed in the inbox of the user in the UI in a manner that visually differentiates said modified message from other messages in the inbox that do not contain content corresponding to said type of content, said visual differentiation comprising the modified message display including visible information indicating that the electronic message contains data corresponding to the user-specified interest in the type of content based on said annotation so as to facilitate selection of the modified message without a need to perform a search of the inbox to locate messages having the particular type of content, wherein said communication is based on said determined identification of a context of the digital content.

2. The method of claim 1, further comprising:
extracting, via the messaging server, said digital content from said electronic message based on said annotation; and
saving, in a datastore on the network associated with the messaging server, said extracted digital content.

3. The method of claim 2, wherein said communication further comprises:
generating an embedded user interface (UI) for viewing and interacting with said extracted digital content; and
communicating, over the network, instructions to said inbox causing the messaging application UI to be modified to display said embedded UI, said embedded UI displaying said extracted digital content.

4. The method of claim 3, wherein said embedded UI further displaying other extracted digital content items from other messages addressed to said inbox that correspond to said content preference information.

5. The method of claim 2, further comprising:
automatically searching, via the messaging server, without user input, a datastore associated with third party entities based on information associated with said extracted digital content;
identifying, by the messaging server, based on said search, third party digital content from said datastore, said third party digital content corresponding to said content preference information and being based on said extracted digital content information; and
communicating, over the network, said identified third party digital content to said inbox for display within said messaging application UI, said identified third party digital content displayed as a message based on said visual differentiation.

6. The method of claim 5, wherein said third party digital content is supplemental content to said received message that was not included in a message previously sent to the user by a providing third party entity.

7. The method of claim 1, further comprising:
saving, in a datastore on the network associated with the messaging server, said content preference information.

8. The method of claim 1, further comprising;
receiving, from the user, input indicating said content preference information, wherein said input comprises at least one of a text entry by the user in association with a text entry area of the messaging application UI, and a selection of recommended content preference information provided within the messaging application UI.

9. The method of claim 1, further comprising:
analyzing activity of said user on the network;
determining, based on said activity, said content preference information; and
communicating, over the network, said content preference information for selection by the user from within the messaging application UI.

10. The method of claim 9, wherein said activity is selected from a group consisting of: actions on messages performed by the user, search history of the user, product identifiers in messages in the inbox of the user, and merchant information.

11. The method of claim 1, wherein said content preference information identifies at least one of a product and product category.

12. A non-transitory computer-readable storage medium tangibly encoded with computer-executable instructions, that when executed by a processor associated with a messaging server, performs a method comprising:
receiving, at the messaging server over a network, content preference information from a user via a user interface (UI) of a messaging application operating on a device of the user and in communication with the messaging server, said content preference information identifying a user-specified interest of the user in a type of content to watch for in electronic messages addressed to an inbox of the user;
receiving, by the messaging server, an electronic message addressed to the inbox of the user, said electronic message comprising digital content;
analyzing, via the messaging server, said electronic message based on said content preference information identifying an interest of the user specified by the user via the UI, and based on said analysis, determining that the digital content included in said electronic message contains data that corresponds to the type of content of interest to the user identified by said content preference information specified by the user via the UI;

annotating, via the messaging server, said electronic message based on said determination, said annotation comprising modifying said electronic message prior to communication to said inbox of the user by adding a content type tag to the electronic message indicating that said digital content of said electronic message contains data that corresponds to the type of content of interest to the user identified by said content preference information;

executing, via the messaging server, a classification and regression software program on said digital content and determining, based on said execution, an identification of a context of the digital content, said context referencing a specific content or a categorical taxonomy; and communicating, via the messaging server, to said inbox of said user, said modified message including the digital content containing the data and the added content type tag indicating that said digital content corresponds to the type of content identified by the content preference information as being of interest to the user for visual display at the inbox of the user in the UI of the messaging application, said communication of said modified message with the added content tag causing the modified message to be displayed in the inbox of the user in the UI in a manner that visually differentiates said modified message from other messages in the inbox that do not contain content corresponding to said type of content, said visual differentiation comprising the modified message display including visible information indicating that the electronic message contains data corresponding to the user-specified interest in the type of content based on said annotation so as to facilitate selection of the modified message without a need to perform a search of the inbox to locate messages having the particular type of content, wherein said communication is based on said determined identification of a context of the digital content.

13. The non-transitory computer-readable storage medium of claim 12, further comprising:

extracting, via the messaging server, said digital content from said electronic message based on said annotation;

saving, in a datastore on the network associated with the messaging server, said extracted digital content;

generating an embedded user interface (UI) for viewing and interacting with said extracted digital content; and communicating, over the network, instructions to said inbox causing the messaging application UI to be modified to display said embedded UI, said embedded UI displaying said extracted digital content.

14. The non-transitory computer-readable storage medium of claim 13, wherein said embedded UI further displaying other extracted digital content items from other messages addressed to said inbox that correspond to said content preference information.

15. The non-transitory computer-readable storage medium of claim 13, further comprising:

automatically searching, via the messaging server, without user input, a datastore associated with third party entities based on information associated with said extracted digital content;

identifying, by the messaging server, based on said search, third party digital content from said datastore, said third party digital content corresponding to said content preference information and being based on said extracted digital content information; and communicating, over the network, said identified third party digital content to said inbox for display within said messaging application UI, said identified third party digital content displayed as a message based on said visual differentiation.

16. A messaging server comprising:

a processor; and a non-transitory computer-readable storage medium tangibly storing thereon program logic for execution by the processor, the program logic comprising:

logic executed by the processor for receiving, at the messaging server over a network, content preference information from a user via a user interface (UI) of a messaging application operating on a device of the user and in communication with the messaging server, said content preference information identifying a user-specified interest of the user in a type of content to watch for in electronic messages addressed to an inbox of the user;

logic executed by the processor for receiving, by the messaging server, an electronic message addressed to the inbox of the user, said electronic message comprising digital content;

logic executed by the processor for analyzing, via the messaging server, said electronic message based on said content preference information identifying an interest of the user specified by the user via the UI, and based on said analysis, determining that the digital content included in said electronic message contains data that corresponds to the type of content of interest to the user identified by said content preference information specified by the user via the UI;

logic executed by the processor for annotating, via the messaging server, said electronic message based on said determination, said annotation comprising modifying said electronic message prior to communication to said inbox of the user by adding a content type tag to the electronic message indicating that said digital content of said electronic message contains data that corresponds to the type of content of interest to the user identified by said content preference information;

logic executed by the processor for executing a classification and regression software program on said digital content and determining, based on said execution, an identification of a context of the digital content, said context referencing a specific content or a categorical taxonomy; and logic executed by the processor for communicating, via the messaging server, to said inbox of said user, said modified message including the digital content containing the data and the added content type tag indicating that said digital content corresponds to the type of content identified by the content preference information as being of interest to the user for visual display at the inbox of the user in the UI of the messaging application, said communication of said modified message with the added content tag causing the modified message to be displayed in the inbox of the user in the UI in a manner that visually differentiates said modified message from other messages in the inbox that do not contain content corresponding to said type of content, said visual differentiation comprising the modified message display including visible information indicating that the electronic message contains data corresponding to the user-specified interest in the type of content based on said annotation so as to facilitate selection of the modified message without a need to perform a search of the inbox to locate messages having the particular type of content, wherein said communication is based on said determined identification of a context of the digital content.

17. The messaging server of claim 16, wherein said communication further comprises:
   logic executed by the processor for extracting, via the messaging server, said digital content from said electronic message based on said annotation;
   logic executed by the processor for saving, in a datastore on the network associated with the messaging server, said extracted digital content;
   logic executed by the processor for generating an embedded user interface (UI) for viewing and interacting with said extracted digital content; and
   logic executed by the processor for communicating, over the network, instructions to said inbox causing the messaging application UI to be modified to display said embedded UI, said embedded UI displaying said extracted digital content.

18. The messaging server of claim 17, wherein said embedded UI further displaying other extracted digital content items from other messages addressed to said inbox that correspond to said content preference information.

19. The messaging server of claim 17, further comprising:
   logic executed by the processor for automatically searching, via the messaging server, without user input, a datastore associated with third party entities based on information associated with said extracted digital content;
   logic executed by the processor for identifying, by the messaging server, based on said search, third party digital content from said datastore, said third party digital content corresponding to said content preference information and being based on said extracted digital content information; and
   logic executed by the processor for communicating, over the network, said identified third party digital content to said inbox for display within said messaging application UI, said identified third party digital content displayed as a message based on said visual differentiation.

* * * * *